US012327658B2

(12) United States Patent
Liang et al.

(10) Patent No.: US 12,327,658 B2
(45) Date of Patent: Jun. 10, 2025

(54) CONDUCTIVE WIRE, CONDUCTIVE COIL, AND CONDUCTIVE DEVICE

(71) Applicant: GOERTEK INC., Shandong (CN)

(72) Inventors: He Liang, Shandong (CN); Minghui Shao, Shandong (CN)

(73) Assignee: GOERTEK INC., Weifang (CN)

( * ) Notice: Subject to any disclaimer, the term of this patent is extended or adjusted under 35 U.S.C. 154(b) by 240 days.

(21) Appl. No.: 18/251,106

(22) PCT Filed: Dec. 16, 2020

(86) PCT No.: PCT/CN2020/136642

§ 371 (c)(1),
(2) Date: Apr. 28, 2023

(87) PCT Pub. No.: WO2022/088427

PCT Pub. Date: May 5, 2022

(65) Prior Publication Data

US 2023/0386707 A1 Nov. 30, 2023

(30) Foreign Application Priority Data

Oct. 30, 2020 (CN) ......................... 202011195598.6

(51) Int. Cl.

| | |
|---|---|
| ***H01B 13/32*** | (2006.01) |
| ***H01B 7/00*** | (2006.01) |
| ***H01B 7/02*** | (2006.01) |
| ***H01B 7/04*** | (2006.01) |
| ***H01B 13/00*** | (2006.01) |

(52) U.S. Cl.

CPC ......... *H01B 13/322* (2013.01); *H01B 7/0009* (2013.01); *H01B 7/0216* (2013.01); *H01B 7/04* (2013.01); *H01B 13/0036* (2013.01)

(58) Field of Classification Search

None

See application file for complete search history.

(56) References Cited

U.S. PATENT DOCUMENTS

2009/0068051 A1* 3/2009 Gross ........................ C01B 6/21 148/692

2012/0152590 A1* 6/2012 Yin ........................ H01B 3/006 427/117

FOREIGN PATENT DOCUMENTS

CN 102568663 A * 7/2012 ............... C08K 3/22

CN 105504684 A 4/2016

CN 106496634 A 3/2017

(Continued)

OTHER PUBLICATIONS

FOR*

International Search Report from International Application No. PCT/CN2020/136642 mailed May 26, 2021.

*Primary Examiner* — Krystal Robinson

(74) *Attorney, Agent, or Firm* — Shih IP Law Group, PLLC

(57) ABSTRACT

A conductive wire, a conductive coil, and a conductive device, wherein in the conductive wire, an aluminum oxide-coated nano-carbon fiber is added to a first paint layer, and a silver-coated nano-carbon fiber is added to a second paint layer. By means of such an arrangement, the coefficient of thermal conductivity of the first paint layer and the second paint layer reaches 2 to 10 W/(m·K), and therefore, the thermal conduction performance of the conductive wire can be remarkably improved, and the thermal conduction wire has an advantage of a good thermal conduction effect, with timely heat dissipation.

13 Claims, 1 Drawing Sheet

(56) References Cited

FOREIGN PATENT DOCUMENTS

| | | | | |
|---|---|---|---|---|
| CN | 107892784 | A | | 4/2018 |
| CN | 107945916 | A | * | 4/2018 |
| CN | 108102144 | A | | 6/2018 |
| CN | 109074909 | A | | 12/2018 |
| CN | 109599208 | A | | 4/2019 |
| CN | 110438589 | A | | 11/2019 |
| CN | 210200349 | U | | 3/2020 |
| CN | 210837239 | U | | 6/2020 |
| JP | 2006057017 | A | | 3/2006 |

* cited by examiner

CONDUCTIVE WIRE, CONDUCTIVE COIL, AND CONDUCTIVE DEVICE

TECHNICAL FIELD

The present disclosure relates to the field of cable processing, in particular relates to a conductive wire, a conductive coil and a conductive device.

DESCRIPTION OF RELATED ART

For a long time, conductive wires are a main raw material for the manufacture of cables, wires, conductor materials, connection terminals and conversion terminals. With the development of modern industry, there are increasingly demanding in safety, high efficiency and energy saving of electrical and electronic devices, and electrical and electronic devices are showing a trend of miniaturization and light weight, however, the miniaturization and light weight of components inevitably lead to an increase in the temperature of their operation environment, and the conductive wires among coils of components that function to insulate also needs to increase the thermal conductive accordingly. However, in the existing conductive wires, in addition to low thermal conductivity of paint layers coated on a conductive core layer, a multi-layer winding arrangement causes the heat generated by the conductive wires to dissipate slowly, which seriously hinders the overall heat dissipation.

Therefore, providing a conductive wire with good thermal conduction performance has become a technical problem to be solved urgently in the art.

SUMMARY

A main object of the present disclosure is to provide a conductive wire, a conductive coil and a conductive device, aiming to solve the technical problem of poor thermal conduction performance of the conductive wire in the prior art.

The technical problem to be solved by the present disclosure is solved by the following technical solutions.

A conductive wire, which includes a conductive core layer, a first paint layer provided on an outer side of the conductive core layer, and a second paint layer provided on an outer side of the first paint layer; wherein, the first paint layer includes aluminum oxide-coated nano-carbon fibers therein, and the second paint layer includes silver-coated nano-carbon fibers therein.

Optionally, the nano-carbon fibers are chopped fibers, and present an anisotropic arrangement, and the chopped fiber has a diameter of 50 nm to 200 nm and a length of 500 nm to 5000 nm.

Optionally, each of the aluminum oxide-coated nano-carbon fiber and the silver-coated nano-carbon fiber is sheet-like structure, and the maximum width of the sheet-like structure is between 100 nm and 10000 nm.

Optionally, in the aluminum oxide-coated nano-carbon fiber, a coating area of the aluminum oxide accounts for 60%-100% of a surface area of the nano-carbon fiber; in the silver-coated nano-carbon fiber, a coating area of the silver accounts for 60%-100% of a surface area of the nano-carbon fiber.

Optionally, density of the aluminum oxide-coated nano-carbon fibers is less than 1.5 g/$cm^3$, and density of the silver-coated nano-carbon fibers is less than 1.5 g/$cm^3$.

Optionally, in the aluminum oxide-coated nano-carbon fiber, mass ratio of the aluminum oxide to the nano-carbon fiber is (5-20):1; in the silver-coated nano-carbon fiber, mass ratio of the silver to the nano-carbon fiber is (5-20):1.

Optionally, coefficient of the thermal conductivity of the first paint layer is 2 to 10 W/(m·K), coefficient of thermal conductivity of the second paint layer is 2 to 10 W/(m·K), and the coefficient of thermal conductivity of the second paint layer is not less than the coefficient of thermal conductivity of the first paint layer.

Optionally, at least one of the first paint layer and the second paint layer is provided with a plurality of layers.

Optionally, the conductive wire further includes a nano-coating layer.

Optionally, the nano-coating layer has a thickness of 0.5 μm to 3 μm.

Optionally, the nano-coating layer is disposed between the conductive core layer and the first paint layer, and/or, the nano-coating layer is disposed between the first paint layer and the second paint layer.

In another aspect of the present disclosure, the present disclosure provides a coil, which is formed by winding the above-mentioned conductive wire.

In yet another aspect of the present disclosure, the present disclosure provides a device including the above-mentioned coil.

Optionally, the device includes at least one of an acoustic device, a wireless charging device, a motor device, and a mobile terminal device.

The present disclosure has following beneficial effects:

In the present disclosure, in the conductive wire, aluminum oxide-coated nano-carbon fibers are creatively added to the first paint layer, and silver-coated nano-carbon fibers are creatively added to the second paint layer. By means of such an arrangement, the coefficient of thermal conductivity of the first paint layer and the second paint layer reaches 2 to 10 W/(m·K), and therefore, the thermal conduction performance of the conductive wire can be remarkably improved, and the thermal conduction wire has an advantage of a good thermal conduction effect, with timely heat dissipation, thereby achieving unexpected technical effects.

BRIEF DESCRIPTION OF DRAWINGS

The accompanying drawings, which are incorporated in and constitute a part of the specification, illustrate embodiments of the present disclosure, and together with the description, serve to explain the principles of the present disclosure.

EXPLANATION OF REFERENCE SIGNS

Figure 1:
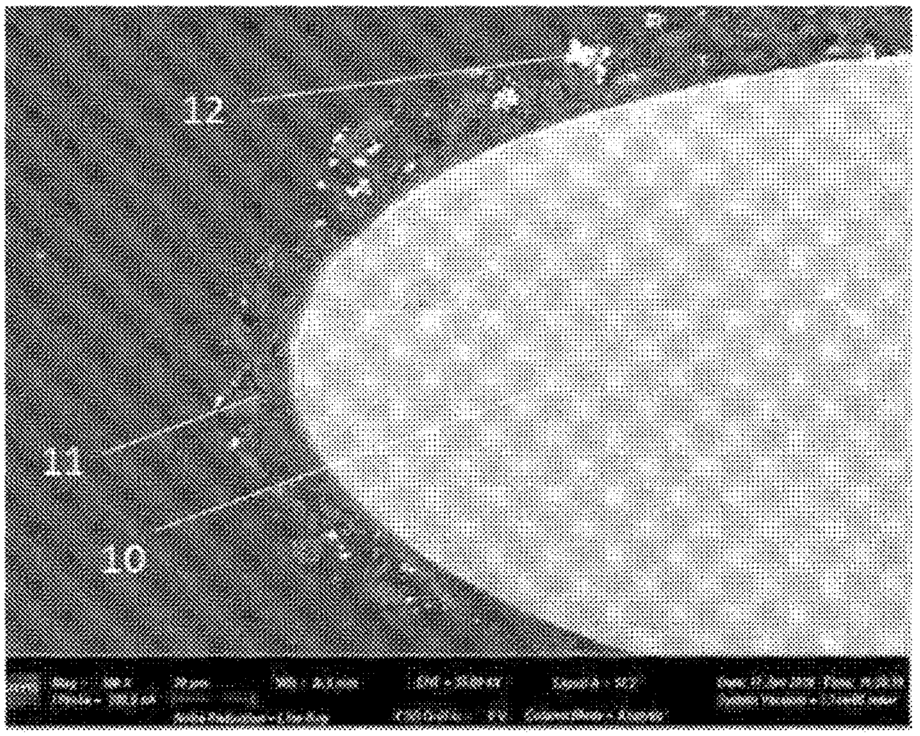
FIG. 1 is a scanning electron micrograph of the conductive wire of the first embodiment of the present disclosure.
Figure 2:
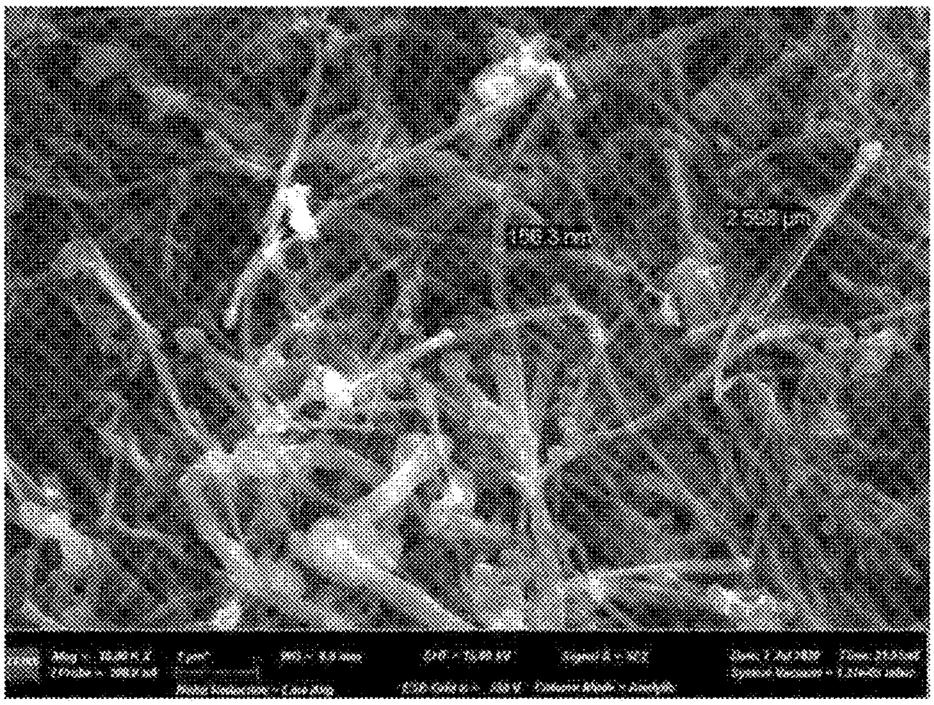
FIG. 2 is a scanning electron micrograph of silver-coated nano-carbon fibers of the present disclosure.

10: conductive core layer; 11: aluminum oxide-coated nano-carbon fibers; 12: silver-coated nano-carbon fibers.

DETAILED DESCRIPTIONS

Raw materials and devices used in the present disclosure, if not specified, are commonly used raw materials and devices in the art. Methods used in the present disclosure, if not specified, are conventional methods in the art.

Unless otherwise specified, meanings of the terms in this specification are the same as those generally understood by those skilled in the art, but if there is any conflict, the definitions in this specification shall prevail.

Herein, terms “comprise”, “include”, “contain”, “including” and “having” or other variations thereof are intended to cover non-closed inclusions and no distinction is made between these terms. The term “include” means that other steps and components that do not affect the final result can be added. The term “include” also includes terms “consist of” and “essentially consist of”. Compositions and methods/processes of the present disclosure include, consist of and essentially consist of the essential elements and limitation items described herein and any additional or optional compositions, components, steps or limitation items described herein.

All numerical values or expressions related to amounts of components, process conditions and the like used in the description and claims are to be understood as modified by “about” in all instances. All ranges related to the same component or property are inclusive of endpoints, which can be independently combined. Since these ranges are continuous, they include every value between the minimum value and maximum value. It should also be understood that any numerical range recited herein is intended to include all sub-ranges within that range.

As described in the background art, the conductive wires in the prior art have the problem of poor thermal conduction performance. In order to solve the above technical problem, the present disclosure provides a conductive wire, a conductive coil and a conductive device.

In a first aspect, the present disclosure provides a conductive wire, the conductive wire includes a conductive core layer, a first paint layer provided on an outer side of the conductive core layer, and a second paint layer provided on an outer side of the first paint layer; wherein, the first paint layer includes aluminum oxide-coated nano-carbon fibers therein, and the second paint layer includes silver-coated nano-carbon fibers therein.

The coefficient of thermal conductivity of the first paint layer and the second paint layer used in the existing conductive wires is low, generally 0.2 W/(m·K) or less, and the thermal conduction performance of the conductive wire is not good. Although adding materials having high thermal conductivity to the first paint layer and the second paint layer can theoretically improve the thermal conductivity of the conductive wire, the inventors have found that not all materials having high thermal conductivity can improve the thermal conductivity of the conductive wire when they are added into the first paint layer and the second paint layer. For example, the coefficient of thermal conductivity of AlN is high and theoretical value thereof reaches 319 W/(m·K), but the thermal conduction performance of the conductive wire obtained after adding AlN to the first paint layer and the second paint layer respectively is not good, which is a technical problem that those skilled in the art have never realized before. After extensive and profound research, the inventors found that nano-carbon fiber (CF) is a fiber with light weight, high strength, and high thermal conductivity and electrical conductivity. By adding nano-carbon fibers into the first paint layer and the second paint layer, the coefficient of thermal conductivity of the first paint layer and the second paint layer can be greatly improved, and the thermal conduction performance of the conductive wire can be significantly improved.

However, since nano-carbon fibers have high electrical and thermal conduction performances while the first paint layer in the conductive wire functions the effect of insulation, it is difficult for the existing first paint layer to have both insulation and thermal conductivity, and therefore, there are few reports that nano-carbon fibers are used in the first paint layer of conductive wires. In the present disclosure, the aluminum oxide is coated on a surface of the nano-carbon fiber, and the aluminum oxide and the nano-carbon fiber cooperate with each other and function synergistically, so that the nano-carbon fiber coated with the aluminum oxide has both insulation and good thermal conductivity. Here, an addition amount of nano-carbon fiber in the first paint layer can be greatly increased, a heat conduction network chain can be formed to the greatest extent while maintaining insulation, and therefore significantly improve the thermal conductivity thereof.

In the present disclosure, the aluminum oxide has electrical insulation and good thermal conductivity, and when the aluminum oxide is coated on the surface of the nano-carbon fiber, the aluminum oxide may cooperate with the nano-carbon fiber, and provide the nano-carbon fiber with insulating property while further improving the thermal conduction performance of the first paint layer, so that the first paint layer has high thermal conductivity, and in the meanwhile has electrical insulation, so as to solve the problem that the existing first paint layer is not easy to have both insulation and thermal conductivity.

As for coils wound by conductive wires, the coils can be bonded together by simple heating, the heating temperature usually needs up to 500° C. The inventors have found in their practice that, when nano-carbon fibers are directly added to the second paint layer, the nano-carbon fibers may undergo high-temperature oxidation, thereby reducing the thermal conductivity of the nano-carbon fibers and the adhesion of the second paint layer, resulting in a poor adhesion effect of the second paint layer. This is a technical problem which have not yet realized by those skilled in the art. In order to solve the above problem, in the present disclosure, silver is coated on the surface of nano-carbon fiber, the present disclosure combines the advantages of the nano-carbon fiber and the silver, to overcome shortcomings thereof, so that the nano-carbon fiber and silver cooperate with each other, in this way, on the one hand, high-temperature oxidation of nano-carbon fiber can be prevented and the adhesion effect of the second paint layer after being coated can be effectively improved, on the other hand, the thermal conductivity and electrical conductivity of the second paint layer can be significantly improved, and furthermore, the problem that silver is easy to migrate is solved, such that silver and the nano-carbon fiber are combined firmly while the dispersion of nano-carbon fibers is increased.

Conductive Core Layer

In the present disclosure, the main function of the conductive core layer is to conduct electricity.

The material of the conductive core layer is not particularly limited in the present disclosure, and the materials of conductive core layers commonly used for conductive wires well-known to those skilled in the art can be used. As an example, the material of the conductive core layer may be but not limited to metal materials such as copper, aluminum, gold, silver, nickel and the like.

First Paint Layer

In the present disclosure, the first paint layer functions the effect of insulation, so as to ensure the insulation performance of the conductive wire, and improve the safety of the conductive wire in use.

In the present disclosure, the raw materials of the first paint layer include insulating paint raw materials and aluminum oxide-coated nano-carbon fibers added therein, and the first paint layer has a good insulating effect.

The composition of the insulating paint raw materials is not particularly limited in the present disclosure, and insulating paint raw materials commonly used for conductive wires well-known to those skilled in the art can be used. As an example, the insulating paint raw materials include polyurethane and the like.

In the present disclosure, the first paint layer may be a single layer or multiple layers. For example, multiple layers of the first paint layer can be applied, and each time the first paint layer is applied, the first paint layer is dried once, so as to form a first paint layer having a multi-layer structure.

The coefficient of thermal conductivity of the first paint layer is 2 to 10 W/(m·K), for example, 2 W/(m·K), 3 W/(m·K), 4 W/(m·K), 5 W/(m·K) K), 6 W/(m·K), 7 W/(m·K), 8 W/(m·K), 9 W/(m·K), 10 W/(m·K), and any value between them.

Aluminum Oxide-Coated Nano-Carbon Fiber

In the present disclosure, in the aluminum oxide-coated nano-carbon fibers, the nano-carbon fibers are chopped fibers, present an anisotropic arrangement. The chopped fiber has a diameter of 50-200 nm and a length of 500-5000 nm. The nano-carbon fiber according to the present disclosure has the characteristics of high dispersion, high strength, high modulus, anti-static electricity, wear resistance and the like.

In the present disclosure, the density of the aluminum oxide-coated nano-carbon fibers is less than 1.5 g/cm$^3$. With this arrangement, the added aluminum oxide-coated nano-carbon fibers are easily dispersed in the insulating paint raw material without precipitation.

In the present disclosure, the aluminum oxide-coated nano-carbon fiber is a sheet-like structure. The inventors found in research that the structure of the aluminum oxide-coated nano-carbon fiber has an important influence on the thermal conductivity of the conductive wire, and the aluminum oxide-coated nano-carbon fiber having a granular structure may affect the improvement of the thermal conductivity of the conductive wire. However, in the present disclosure, the aluminum oxide-coated nano-carbon fiber having a sheet-like structure are conducive to the aluminum oxide-coated nano-carbon fibers to connect into a network with each other to form a heat dissipation channel, and thereby can significantly improve the thermal conductivity of the conductive wire.

In the present disclosure, the maximum width of the sheet-like structure of the aluminum oxide-coated nano-carbon fiber is between 100 nm and 10000 nm. If the sheet-like structure has a too small size, the aluminum oxide-coated nano-carbon fibers are not easy to be connected into a three-dimensional channel; if the sheet-like structure has a too large size, it may exceed the thickness of the paint layer.

In the present disclosure, in the aluminum oxide-coated nano-carbon fiber, a coating area of the aluminum oxide accounts for 60%-100% of a surface area of the nano-carbon fiber; more preferably, the coating area of the aluminum oxide accounts for 100% of the surface area of the nano-carbon fiber.

In the present disclosure, in the aluminum oxide-coated nano-carbon fiber, the mass ratio of the aluminum oxide to the nano-carbon fiber is (5-20):1, for example, 5:1, 6:1, 8:1, 10:1, 12:1, 14:1, 16:1, 18:1, 20:1, and any value between them.

Second Paint Layer

In the present disclosure, the second paint layer is mainly used to meet the requirements for a coil forming process, functions a bonding effect, and functions to protect and strengthen the first paint layer. As for the coils wound by the conductive wires, the coil can be bonded together by simple heating.

In the present disclosure, the raw materials of the second paint layer include self-adhesive paint raw materials and a silver-coated nano-carbon fiber added therein, the second paint layer has viscosity under heating conditions, and obtains structural strength after curing, so that the coil can be formed firmly.

The composition of the self-adhesive paint raw materials is not particularly limited in the present disclosure, and the self-adhesive paint raw materials commonly used for conductive wires well-known to those skilled in the art can be used. As an example, the self-adhesive paint raw materials include polyamide and the like.

The second paint layer may be a single layer or multiple layers.

The coefficient of thermal conductivity of the second paint layer is 2 to 10 W/(m·K), for example, 2 W/(m·K), 3 W/(m·K), 4 W/(m·K), 5 W/(m·K) K), 6 W/(m·K), 7 W/(m·K), 8 W/(m·K), 9 W/(m·K), 10 W/(m·K), and any value between them.

The thermal conductivity of the second paint layer is not less than the thermal conductivity of the first paint layer.

Silver-Coated Nano-Carbon Fiber

In the silver-coated nano-carbon fibers, the nano-carbon fibers are chopped fibers, and present an anisotropic arrangement. The chopped fiber has a diameter of 50-200 nm and a length of 500-5000 nm. The nano-carbon fiber according to the present disclosure has the characteristics of high dispersion, high strength, high modulus, anti-static electricity, wear resistance and the like.

In the present disclosure, the density of the silver-coated nano-carbon fibers is less than 1.5 g/cm$^3$. With this arrangement, the added silver-coated nano-carbon fibers are easily dispersed in the insulating paint raw materials without precipitation.

The silver-coated nano-carbon fiber is a sheet-like structure. The inventors found in research that the structure of the silver-coated nano-carbon fiber has an important influence on the thermal conductivity of the conductive wire, and the silver-coated nano-carbon fiber having a granular structure may affect the improvement of the thermal conductivity of the conductive wire. However, in the present disclosure, the silver-coated nano-carbon fiber has a sheet-like structure and can significantly improve the thermal conductivity of the conductive wire.

In the present disclosure, the maximum width of the sheet-like structure of the silver-coated nano-carbon fiber is between 100 nm and 10000 nm. If the sheet-like structure has a too small size, the silver-coated nano-carbon fibers are not easy to be connected into a three-dimensional channel; if the sheet-like structure has a too large size, it may exceed the thickness of the paint layer.

In the silver-coated nano-carbon fiber, a coating area of the silver accounts for 60%-100% of a surface area of the nano-carbon fiber; more preferably, a coating area of the silver accounts for 100% of a surface area of nano-carbon fiber.

In the present disclosure, in the silver-coated nano-carbon fiber, the mass ratio of the aluminum oxide to the nano-carbon fiber is (5-20):1, for example, 5:1, 6:1, 8:1, 10:1, 12:1, 14:1, 16:1, 18:1, 20:1, and any value between them.

In the present disclosure, the method for manufacturing the silver-coated nano-carbon fiber is not particularly limited, and various methods well-known to those skilled in the art can be used, for example, chemical plating, electroplating, light radiation and thermal decomposition methods and the like can be used.

In a second aspect, the present disclosure provides a coil, which is formed by winding the conductive wire according to the first aspect.

In a third aspect, the present disclosure provides a device, which includes the above-mentioned coil.

In the present disclosure, the type of the device is not particularly limited, and various devices that require coils, including but not limited to at least one of acoustic devices, wireless charging devices, motor devices, and mobile terminal devices, may be applied.

In order to better understand the above technical solutions, the above technical solutions will be described in detail below in conjunction with specific examples. The examples are only preferred embodiments of the present disclosure, and are not limitations of the present disclosure.

Example 1

A conductive wire, which includes a conductive core layer, a first paint layer provided on an outer side of the conductive core layer, and a second paint layer provided on an outer side of the first paint layer; wherein, the first paint layer includes aluminum oxide-coated nano-carbon fibers therein, and the second paint layer includes silver-coated nano-carbon fibers therein.

The nano-carbon fibers are chopped fibers, and present an anisotropic arrangement, and the chopped fiber has a diameter of 50 nm to 200 nm and a length of 500 nm to 5000 nm.

Each of the aluminum oxide-coated nano-carbon fiber and the silver-coated nano-carbon fiber is sheet-like structure, and the maximum width of the sheet-like structure is between 100 nm and 10000 nm.

In the aluminum oxide-coated nano-carbon fiber, a coating area of the aluminum oxide accounts for 90% of a surface area of the nano-carbon fiber; in the silver-coated nano-carbon fiber, a coating area of the silver accounts for 100% of a surface area of nano-carbon fiber.

The density of the aluminum oxide-coated nano-carbon fibers is less than 1.5 g/cm$^3$, and the density of the silver-coated nano-carbon fibers is less than 1.5 g/cm$^3$.

In the aluminum oxide-coated nano-carbon fiber, the mass ratio of the aluminum oxide to the nano-carbon fiber is 10:1; in the silver-coated nano-carbon fiber, the mass ratio of the silver to the nano-carbon fiber is 12:1.

The coefficient of thermal conductivity of the first paint layer is 2 to 10 W/(m·K); the coefficient of thermal conductivity of the second paint layer is 2 to W/(m·K), the coefficient of thermal conductivity of the second paint layer is not less than the coefficient of thermal conductivity of the first paint layer.

Example 2

A conductive wire, which includes a conductive core layer, a nano-coating layer provided on an outer side of the conductive core layer, a first paint layer provided on an outer side of the nano-coating layer, and a second paint layer provided on an outer side of the first paint layer; wherein, the first paint layer includes aluminum oxide-coated nano-carbon fibers therein, and the second paint layer includes silver-coated nano-carbon fibers therein.

The nano-carbon fibers are chopped fibers, and present an anisotropic arrangement, and the chopped fiber has a diameter of 50 nm to 200 nm and a length of 500 nm to 5000 nm.

Each of the aluminum oxide-coated nano-carbon fiber and the silver-coated nano-carbon fiber is sheet-like structures, and the maximum width of the sheet-like structure is between 100 nm and 10000 nm.

In the aluminum oxide-coated nano-carbon fiber, a coating area of the aluminum oxide accounts for 60% of a surface area of the nano-carbon fiber; in the silver-coated nano-carbon fiber, a coating area of the silver accounts for 90% of a surface area of nano-carbon fiber.

The density of the aluminum oxide-coated nano-carbon fiber is less than 1.5 g/cm$^3$, and the density of the silver-coated nano-carbon fiber is less than 1.5 g/cm$^3$.

In the aluminum oxide-coated nano-carbon fiber, the mass ratio of the aluminum oxide to the nano-carbon fiber is 5:1; in the silver-coated nano-carbon fiber, the mass ratio of the silver to the nano-carbon fiber is 20:1.

The coefficient of thermal conductivity of the first paint layer is 2 to 10 W/(m·K); the coefficient of thermal conductivity of the second paint layer is 2 to W/(m·K), the coefficient of thermal conductivity of the second paint layer is not less than the coefficient of thermal conductivity of the first paint layer.

The thickness of the nano-coating layer is 1 μm, and the nano-coating layer is a silicon dioxide coating.

Example 3

A conductive wire, which includes a conductive core layer, a first paint layer provided on an outer side of the conductive core layer, a nano-coating layer provided on an outer side of the first paint layer, and a second paint layer provided on an outer side of the nano-coating layer; wherein, the first paint layer includes aluminum oxide-coated nano-carbon fibers therein, and the second paint layer includes silver-coated nano-carbon fibers therein.

The nano-carbon fibers are chopped fibers, and present an anisotropic arrangement, and the chopped fiber has a diameter of 50 nm to 200 nm and a length of 500 nm to 5000 nm.

Each of the aluminum oxide-coated nano-carbon fiber and the silver-coated nano-carbon fiber is sheet-like structure, and the maximum width of the sheet-like structure is between 100 nm and 10000 nm.

In the aluminum oxide-coated nano-carbon fiber, a coating area of the aluminum oxide accounts for 100% of a surface area of the nano-carbon fibers; in the silver-coated nano-carbon fiber, a coating area of the silver accounts for 60% of a surface area of nano-carbon fiber.

The density of the aluminum oxide-coated nano-carbon fibers is less than 1.5 g/cm$^3$, and the density of the silver-coated nano-carbon fibers is less than 1.5 g/cm$^3$.

In the aluminum oxide-coated nano-carbon fiber, the mass ratio of the aluminum oxide to the nano-carbon fiber is 20:1; in the silver-coated nano-carbon fiber, the mass ratio of the silver to the nano-carbon fiber is 5:1.

The coefficient of thermal conductivity of the first paint layer is 2 to 10 W/(m·K); the coefficient of thermal conductivity of the second paint layer is 2 to 10 W/(m·K), the coefficient of thermal conductivity of the second paint layer is not less than the coefficient of thermal conductivity of the first paint layer.

The thickness of the nano-coating layer is 0.5 μm, and the nano-coating layer is a silicon dioxide coating.

Example 4

A conductive wire, which includes a conductive core layer, a nano-coating layer provided on an outer side of the conductive core layer, a first paint layer provided on an outer side of the nano-coating layer, a nano-coating layer provided on an outer side of the first paint layer, and a second paint layer provided on an outer side of the nano-coating layer; wherein, the first paint layer includes aluminum oxide-coated nano-carbon fibers therein, and the second paint layer includes silver-coated nano-carbon fibers therein.

The nano-carbon fibers are chopped fibers, and present an anisotropic arrangement, and the chopped fiber has a diameter of 50 nm to 200 nm and a length of 500 nm to 5000 nm.

Each of the aluminum oxide-coated nano-carbon fiber and the silver-coated nano-carbon fiber are sheet-like structure, and the maximum width of the sheet-like structure is between 100 nm and 10000 nm.

In the aluminum oxide-coated nano-carbon fiber, a coating area of the aluminum oxide accounts for 90% of a surface area of the nano-carbon fibers; in the silver-coated nano-carbon fiber, a coating area of the silver accounts for 85% of a surface area of nano-carbon fiber.

The density of the aluminum oxide-coated nano-carbon fibers is less than 1.5 g/cm$^3$, and the density of the silver-coated nano-carbon fibers is less than 1.5 g/cm$^3$.

In the aluminum oxide-coated nano-carbon fiber, the mass ratio of the aluminum oxide to the nano-carbon fiber is 12:1; in the silver-coated nano-carbon fiber, the mass ratio of the silver to the nano-carbon fiber is 8:1.

The coefficient of thermal conductivity of the first paint layer is 2 to 10 W/(m·K); the coefficient of thermal conductivity of the second paint layer is 2 to 10 W/(m·K), the coefficient of thermal conductivity of the second paint layer is not less than the coefficient of thermal conductivity of the first paint layer.

The nano-coating layer provided on the outer side of the conductive core layer has a thickness of 3 μm, and the nano-coating layer provided on the outer side of the first paint layer has a thickness of 0.5 μm.

Comparative Example 1

Comparative is different from Example 1 in that, in Comparative Example 1, the aluminum oxide-coated nano-carbon fiber is replaced by AlN, and the silver-coated nano-carbon fiber is replaced by AlN.

Comparative Example 2

Comparative Example 2 uses a commercially available conductive wire, wherein no high thermal conductivity material is added to the first paint layer, and no high thermal conductivity material is added to the second paint layer.

Comparative Example 3

Comparative example 3 is different from Example 1 in that, each of the aluminum oxide-coated nano-carbon fiber and the silver-coated nano-carbon fiber is granular structure.

Comparative Example 4

Comparative example 4 is different from Example 1, the aluminum oxide-coated nano-carbon fiber is replaced by nano-carbon fiber.

Comparative Example 5

Comparative example 5 is different from Example 1 in that, the silver-coated nano-carbon fiber is replaced by nano-carbon fiber.

In order to verify the performance of products of the present disclosure, coils made of the conductive wires in Examples 1-4 and coils made of Comparative Examples 1-5 were respectively tested for thermal conductivity performance. The specific method is as follows:

The conductive wires in Examples 1-4 and the conductive wires in Comparative Examples 1-5 are respectively used to form coils as loudspeaker voice coils, and temperature variations of the loudspeaker voice coils in use over time are measured. The unit of temperature of the loudspeaker voice coils is ° C. Taking 3 samples for each example for testing. The results are shown in Table 1 below.

TABLE 1

| | 10 s | 20 s | 30 s | 40 s | 50 s | 100 s | 150 s | 200 s |
|---|---|---|---|---|---|---|---|---|
| Example 1 | 54.7 | 65.72 | 74.03 | 77.50 | 78.94 | 80.05 | 80.21 | 80.21 |
| Example 2 | 53.16 | 64.65 | 73.67 | 77.79 | 79.59 | 80.84 | 80.88 | 80.88 |
| Example 3 | 52.47 | 64.38 | 73.50 | 77.55 | 79.31 | 80.60 | 80.62 | 80.62 |
| Example 4 | 52.41 | 64.27 | 72.91 | 75.17 | 76.60 | 77.48 | 77.65 | 77.65 |
| Comparative Example 1 | 60.45 | 85.88 | 96.9 | 101.48 | 103.37 | 104.78 | 104.84 | 104.86 |
| Comparative Example 2 | 61.79 | 88.92 | 100.6 | 105.48 | 107.67 | 109.65 | 109.78 | 109.78 |
| Comparative Example 3 | 60.25 | 84.3 | 94.73 | 99.09 | 100.93 | 102.36 | 102.45 | 102.45 |
| Comparative Example 4 | 59.22 | 83.55 | 93.62 | 97.63 | 99.3 | 100.41 | 100.45 | 100.57 |
| Comparative Example 5 | 58.71 | 83.43 | 94.08 | 98.03 | 100.61 | 101.81 | 102.18 | 102.18 |

As can be seen from Table 1, in the present disclosure, in the conductive wire, an aluminum oxide-coated nano-carbon fiber is added in the first paint layer, and a silver-coated nano-carbon fiber is added in the second paint layer. Each of the aluminum oxide-coated nano-carbon fiber and the silver-coated nano-carbon fiber is sheet-like structure. By means of such an arrangement, the thermal conduction performance of the conductive wire can be remarkably improved, and the thermal conduction wire has an advantage of a good thermal conduction effect, with timely heat dissipation, thereby unexpected technical effects are achieved.

The above-described embodiments only express the implementation manners of the present disclosure, and specific and detailed description is provided, but it should not be interpreted as limiting the scope of the patent of the present disclosure. All technical solutions obtained in the form of equivalent replacement or equivalent transformation shall fall within the protection scope of the present disclosure.

What is claimed is:

1. A conductive wire comprising:

a conductive core layer;

a first paint layer provided on an outer side of the conductive core layer; and a second paint layer provided on an outer side of the first paint layer, wherein, the first paint layer includes aluminum oxide-coated nano-carbon fibers therein, and the second paint layer includes silver-coated nano-carbon fibers therein.

2. The conductive wire according to claim 1, wherein the nano-carbon fibers are chopped fibers, and present an anisotropic arrangement, and the chopped fiber has a diameter of 50 nm to 200 nm and a length of 500 nm to 5000 nm.

3. The conductive wire according to claim 1, wherein each of the aluminum oxide-coated nano-carbon fiber and the silver-coated nano-carbon fiber is sheet-like structure, and maximum width of the sheet-like structure is between 100 nm and 10000 nm.

4. The conductive wire according to claim 1, wherein in the aluminum oxide-coated nano-carbon fiber, a coating area of the aluminum oxide accounts for 60%-100% of a surface area of the nano-carbon fiber; in the silver-coated nano-carbon fiber, a coating area of the silver accounts for 60%-100% of a surface area of the nano-carbon fiber.

5. The conductive wire according to claim 1, wherein density of the aluminum oxide-coated nano-carbon fibers is less than 1.5 g/cm3, and density of the silver-coated nano-carbon fibers is less than 1.5 g/cm3.

6. The conductive wire according to claim 1, wherein in the aluminum oxide-coated nano-carbon fiber, mass ratio of the aluminum oxide to the nano-carbon fiber is (5-20):1; in the silver-coated nano-carbon fiber, mass ratio of the silver to the nano-carbon fiber is (5-20):1.

7. The conductive wire according to claim 1, wherein coefficient of thermal conductivity of the first paint layer is 2 to 10 W/(m·K), coefficient of thermal conductivity of the second paint layer is 2 to 10 W/(m·K), and the coefficient of thermal conductivity of the second paint layer is not less than the coefficient of thermal conductivity of the first paint layer.

8. The conductive wire according to claim 7, wherein the nano-coating layer has a thickness of 0.5 μm to 3 μm.

9. The conductive wire according to claim 7, wherein the nano-coating layer is disposed between the conductive core layer and the first paint layer, and/or the nano-coating layer is disposed between the first paint layer and the second paint layer.

10. The conductive wire according to claim 1, wherein the conductive wire further comprises a nano-coating layer.

11. A coil formed by winding the conductive wire according to claim 1.

12. A device comprising the coil according to claim 11.

13. The device according to claim 12, wherein the device comprises at least one of an acoustic device, a wireless charging device, a motor device, and a mobile terminal device.

* * * * *